May 31, 1960 J. J. SAYKAY 2,939,121

SELECTIVE LOAD ENERGIZATION

Filed Sept. 4, 1953 2 Sheets-Sheet 1

INVENTOR.
JOSEPH J. SAYKAY
BY
Campbell, Brumbaugh, Free & Graves
HIS ATTORNEYS.

May 31, 1960 J. J. SAYKAY 2,939,121

SELECTIVE LOAD ENERGIZATION

Filed Sept. 4, 1953 2 Sheets-Sheet 2

INVENTOR.
JOSEPH J. SAYKAY
BY
Campbell, Brumbaugh, Free & Graves
HIS ATTORNEYS.

2,939,121

SELECTIVE LOAD ENERGIZATION

Joseph J. Saykay, Sea Cliff, N.Y., assignor to Fairchild Camera and Instrument Corporation, Syosset, N.Y., a corporation of Delaware Filed Sept. 4, 1953, Ser. No. 378,475

2 Claims. (Cl. 340—176)

This invention relates to apparatus for energizing selected load means and, more particularly, pertains to such apparatus employing rectifier stacks.

My co-pending application Serial No. 178,186, filed August 8, 1950, for "Electrical Keyboard", now Patent No. 2,665,336, discloses circuits that employ a plurality of stacks of rectifiers, connected in parallel relation, for generating a desired number of coded electrical impulses to be utilized in communications equipment. With the use of such rectifier stacks, much of the complicated mechanical apparatus formerly necessary has been obviated resulting in a simple, inexpensive keyboard.

Although the foregoing circuit arrangements have been advantageous, certain difficulties have arisen with the paralleling of large numbers of rectifiers. Primarily, the system operates due to the differential between the low forward resistance and the high back resistance of the rectifiers. However, when many rectifiers are disposed in parallel, the combined leakage current through the back resistance becomes a substantial current flow and occasionally causes the energization of unselected load means.

It is a primary object of the present invention, accordingly, to provide electrical circuits including stacks of rectifiers for energizing selected load means irrespective of the number of paralleled rectifiers.

This and further objects are accomplished in one embodiment of the invention by paralleling a plurality of stacks of rectifiers for controlling a plurality of relays. Upon the selective operation of one or more of these relays through a rectifier stack, a control relay will be energized to prevent the further operation of any unselected relays by leakage currents. However, the selected relay or relays will remain excited through an alternate energizing path completed upon their actuation.

In another embodiment of the invention, gas diodes may be selectively energized by the rectifier stacks, and since a certain threshold voltage is required thereacross to ionize the gas, the diodes will conduct only upon the coupling of a voltage source thereto through the forwardly directed rectifiers, the voltage across the diodes due to leakage current in the backward direction being insufficient to cause any difficulties.

In still another embodiment of the invention, the properties of gas triodes, commonly termed thyratrons, may be advantageously utilized. Thus, the thyratrons will be provided with a striking voltage at the grids thereof only upon the coupling of a voltage source thereto through the forwardly directed rectifiers, the voltage due to the leakage current in the back direction again being insufficient to strike the tubes.

These and further objects and advantages of the invention will be more readily understood when the following description is read in connection with the accompanying drawings in which.

Figure 1:
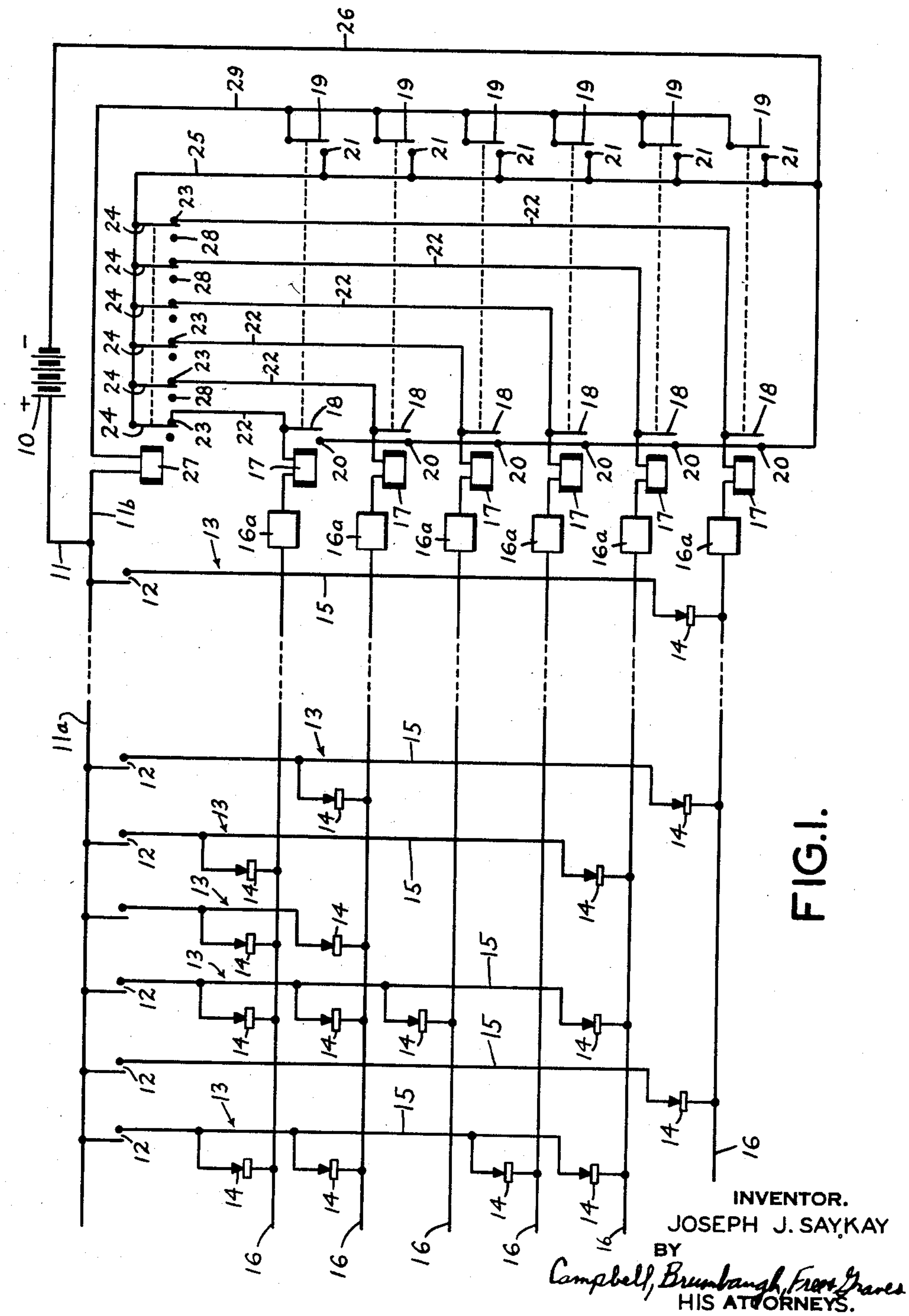
Fig. 1 is a schematic diagram of one form of circuit embodying the present invention.

Referring to the drawings and particularly to Fig. 1, a representative schematic circuit embodying the present invention is illustrated. A power source 10, shown here as a battery, has its positive terminal connected through conductors 11 and **11*a* to a plurality of switches 12**, illustrated schematically only and which may take any convenient form depending upon their manner of actuation. For example, they may be plunger actuated by the striking of a keyboard or cam actuated by a key striking linkage found in a conventional typewriter.

Connected to one contact of each of the switches 12 by a conductor 15 is a rectifier stack 13 consisting of at least one rectifier 14, preferably of the well known selenium type. It is obvious that other conventional rectifiers may be employed such as the copper oxide and high vacuum types. Joining the stacks 13 are conductors 16, connected to the rectifiers 14 in a predetermined manner to provide the necessary code combinations. Although only seven rectifier stacks 13 are illustrated in Fig. 1, the employment of as many stacks as necessary is contemplated. Thus, with six conductors 16, there are sixty-four different combinations of rectifiers possible if a binary code is contemplated and if desirable, all sixty-four may be utilized which would call for a like number of stacks 13.

Each of the conductors 16 is connected through a load device **16*a*, comprising any desired electro-responsive element, to an energizing winding of a relay 17 having a pair of interconnected armatures 18 and 19 engaging, when energized, relay contacts 20 and 21, respectively. The energizing circuit for each of the relays 17 is normally completed through a conductor 22, a relay contact 23, an armature 24 and conductors 25 and 26 to the negative terminal of the power source 10**.

Also connected to the positive terminal of the power source 10 through the conductor 11 and a conductor **11*b* is a control relay 27, which upon energization, actuates mechanically interconnected armatures 24 into engagement with relay contacts 28. The electrical circuit for the control relay 27 is completed through a conductor 29, one of the armatures 19 engaging the corresponding contact 21 and the conductors 25 and 26 to the negative terminal of the power source 10**.

Figures 2, 3:
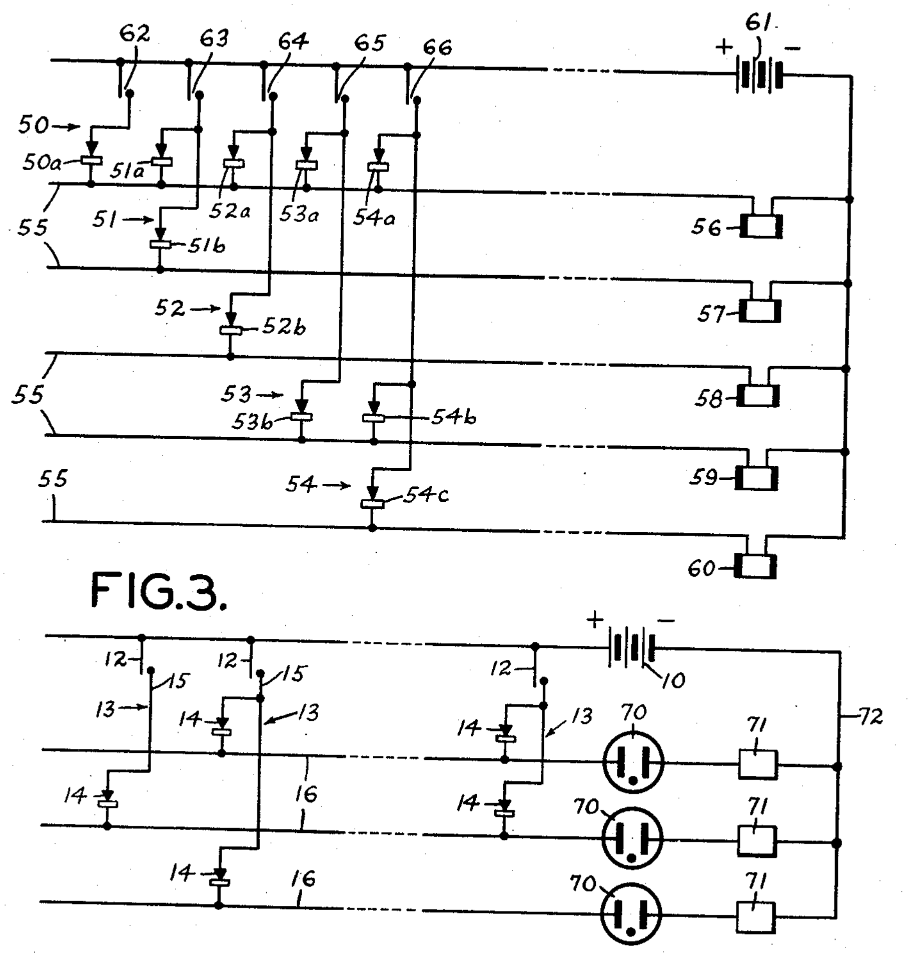
Fig. 2 is a schematic diagram of a circuit helpful in describing certain principles of the invention.
Fig. 3 is a schematic diagram of another form of circuit embodying the invention.

In describing a typical operation of the embodiment of the invention illustrated in Fig. 1, reference will be made to Fig. 2 to aid in understanding the necessity for the control relay 27 and the circuits associated therewith. Five rectifier stacks 50 to 54, inclusive, are illustrated in Fig. 2, and are joined by conductors 55 to five relays 56 to 60, respectively. A power source 61 having a potential of, for example, 24 volts, is selectively connected through switches 62 to 66, inclusive, to the rectifier stacks. It will be assumed in the operation of this circuit that the relays 56 to 60 are 24-volt relays requiring 100 milliamperes of current for energization. It will also be assumed that a leakage current of 1 milliampere will flow in the back direction through the rectifiers when the power source 61 is impressed thereacross in the reverse direction.

In the operation of the circuit shown in Fig. 2, closing the switch 62 results in a current flow from the positive terminal of the power source 61 through a rectifier **50*a*, the conductor 55 and the relay 56 to the negative terminal of the power source 61. However, in addition to the current path through the relay 56, substantially all of the 24 volts from the source 61 will be impressed across the rectifier 51a in the reverse direction, if the small voltage drop in the forward direction across the rectifiers is neglected. Such voltage will cause a leakage current of 1 milliampere to flow through the rectifier 51a in the reverse direction, 51b in the forward direction, the conductor 55 and the relay 57. In the same manner, a leakage current of 3 milliamperes will be contributed by the rectifiers 52a, 53a and 54a in the same manner as described in connection with the leakage current through the rectifier 51a. Therefore, the total leakage current when the switch 62 is closed will be 4 milliamperes. Pursuing the same theory, the leakage current will amount to 3 milliamperes when the switches 63, 64, and 65 are closed and 2 milliamperes when the switch 66** is closed. It is apparent that as the number of rectifier stacks is increased, the total leakage current will also increase. When such current attains a magnitude necessary to operate an unselected relay, the circuit is no longer dependable.

It should be understood that the leakage current and the voltage across the relays may be substantially below the rated current and voltage and nevertheless cause actuation of the unselected relays. Under these conditions, the unselected relays will operate after a time lag determined by both the lag introduced by relay operation at less than rated voltage and current and the time necessary for the leakage current to build up through the rectifiers. The embodiment of the invention shown in Fig. 1 takes advantage of this time lag in its manner of operation.

Returning to a typical operation of the embodiment of the invention illustrated in Fig. 1, the closure of any one of the switches 12 places one of the rectifier stacks 13 in circuit with the power supply 10. Accordingly, the selected load devices 16a will be energized simultaneously with the corresponding relays 17, and the relay armatures 18 and 19 will engage the contacts 20 and 21, respectively. This action will complete an alternate energizing circuit for the selected relays 17 through the armature 18, the contact 20 and the conductor 26 to the power supply 10 and will also establish an energizing circuit for the control relay 27 through the conductor 29, the armature 19, the contact 21, and the conductors 25 and 26 to the power supply 10. The completion of this last-mentioned circuit excites the control relay 27 and pulls the armatures 24 from the contacts 23. Accordingly, it will be impossible for an unselected relay 17 to be energized since the leakage current path has been broken. It is to be noted, however, that the selected relay or relays 17 will remain energized due to the alternate energizing circuit described above.

With this arrangement, it is obvious that any desired number of rectifier stacks may be paralleled since the leakage current circuits therethrough are interrupted before the unselected relays can be energized by such current.

The load devices 16a when energized may preferably transmit electrical impulses. However, such devices are exemplary only and may be omitted in favor of either additional contacts engaged by the relay armatures 18 or 19 or additional armatures associated with the relays 17 to be actuated for energizing perforating devices. Alternatively, any conventional electrical elements may be placed in series relation with the relays 17 in any other desired manner, as for example, between each of the relays 17 and the armatures 18 to be excited simultaneously therewith as are the load devices 16a. Such devices may generate impulses for remote printing circuits and are well known in the art as is their connection in the relay circuits. Accordingly, they need not be described in detail herein.

Referring next to Fig. 3, further circuitry embodying the present invention is illustrated. The elements identical with those found in Fig. 1 are designated by like reference characters. The rectifier stacks 13 are joined in parallel relation by the conductors 16 and include the rectifiers 14. Coupling the power supply 10 to the rectifier stacks 13 are the switches 12 and the conductors 15. The conductors 16 are in circuit with gas-filled diodes 70 coupled to the power supply 10 through load devices 71 and a conductor 72. The load devices 71 may be any desired electro-responsive elements.

In a typical operation of the circuit illustrated in Fig. 3, the voltage of the power supply 10 must be greater than the ionizing potential of the gas-filled diodes. Upon the closure of one of the switches 12, the voltage of source 10 will be impressed across one or more of the gas diodes 70 and cause the ionization thereof. The resulting current flow through the diodes 70 will energize the load elements 71 in series therewith. However, the leakage current flowing through the high back resistance of the rectifiers and the high resistance of the diodes 70 will be negligible and therefore insufficient to build up the necessary voltage across the diodes 70 to ionize the gas therein. Thus, this circuit also allows any desired number of rectifier stacks to be paralleled without the danger of operating unselected load devices.

Figure 4:
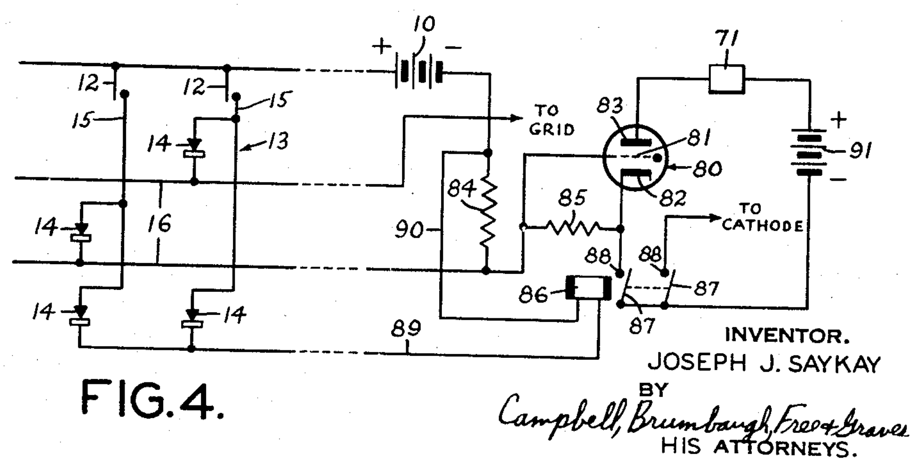
Fig. 4 is a partial schematic diagram of a further circuit embodying the invention.

A further embodiment of the invention is illustrated in Fig. 4 and applied to only one load device for clarity. Since the circuit is similar in many respects to Figs. 1 and 2, like elements have been designated by like reference characters. The source 10 is joined to the rectifier stacks 13 by the switches 12, one of the rectifiers 14 being connected to the grid 81 of a thyratron 80 by the conductor 16. Also joined to the grid 81 is a bias resistor 84 and a grid leak resistor 85 leading to the source 10 and a cathode 82, respectively. A relay 86, having mechanically interconnected armatures 87 engaging relay contacts 88 joined to the cathode of the thyratron 80 and to the cathode of another thyratron (not shown), is coupled between another of the rectifiers 14 and the source 10 by conductors 89 and 90. The load device 71 is in circuit with an anode 83 and a source of electrical energy 91 and may consist of any desirable electro-responsive element which will, for example, perforate paper or transmit electrical impulses upon energization thereof.

In a typical operation of this embodiment of the invention, the switch 12 on the left may be closed to positively bias the grid 81 as current flows through the rectifier 14 and the resistor 84. Simultaneously, the relay 86 is energized through another rectifier 14 resulting in the armatures 87 engaging the contacts 88 and applying the source 91 across the thyratron 80 and other thyratrons not shown. In view of the positive bias afforded the grid 81 by the source 10, the tube 80 will fire and the load 71 will, accordingly, be energized. Upon the opening of the switch 12, the armatures 87 will be disengaged from the contacts 88 and the tube 80 will be extinguished.

As mentioned above, only one thyratron 80 and the circuits associated therewith is shown. It is manifest that a plurality of the rectifier stacks 13 and the tubes 80 may be employed as described in connection with Fig. 1. For each tube, another armature 87 and contact 88 will be furnished the relay 86. Any desired number of rectifier stacks in parallel may be utilized in this embodiment of the invention and the voltage drops due to the leakage current will divide so that the large component of voltage will be across the very high back resistance of the rectifiers 14, and the small voltage component will be across the resistors 84 and of insufficient magnitude to strike the thyratrons.

Accordingly, the present invention provides apparatus permitting the use of any desired number of rectifier stacks in parallel and the consequent selection of any desired number of load devices for generating groups of coded impulses in remote printing applications and the like.

It will be understood that the above-described embodiments of the invention are illustrative only and modifications thereof will occur to those skilled in the art. Therefore, the invention is not limited to the specific apparatus disclosed herein but is to be defined by the appended claims.

I claim:

1. In electrical apparatus, the combination of a plurality of stacks of rectifiers, said stacks being connected in parallel relation, each of said stacks including at least one of said rectifiers, a source of electrical energy, a plurality of relays coupled to said stacks and to said source, means for selectively coupling said source to at least one of said stacks for energizing a selected number of said relays, means responsive to the energization of said selected number of said relays for disconnecting the unselected relays from said source, and means to provide a holding circuit for each of said energized relays.

2. In electrical apparatus, the combination of a plurality of stacks of rectifiers, said stacks being connected in parallel relation, a source of electrical energy, means for selectively joining said source to each of said stacks, a plurality of relays coupled to said stacks and to said source, switching means for interrupting the coupling of said relays to said source, relay means responsive to the energization of at least one of said relays for operating said switching means, and means to provide a holding circuit for each of said energized relays.

References Cited in the file of this patent

UNITED STATES PATENTS

| | | |
|---|---|---|
| 876,701 | Drewell | Jan. 14, 1908 |
| 2,549,779 | Crenshaw | Apr. 24, 1951 |
| 2,686,299 | Eckert | Aug. 10, 1954 |
| 2,688,661 | Van Mierlo | Sept. 7, 1954 |

FOREIGN PATENTS

| | | |
|---|---|---|
| 363,696 | Great Britain | Dec. 21, 1931 |
| 666,314 | Great Britain | Feb. 13, 1952 |

OTHER REFERENCES

Publication, Proceedings of the I.R.E. Feb. 1949, Title of Rectifier Networks for Multipositioning Switching, by Brown and Rochester, pp. 139–147.